Oct. 21, 1952 A. LENART ET AL 2,614,254
CLIP FORMING AND APPLYING MACHINE
Filed March 5, 1947 10 Sheets-Sheet 1
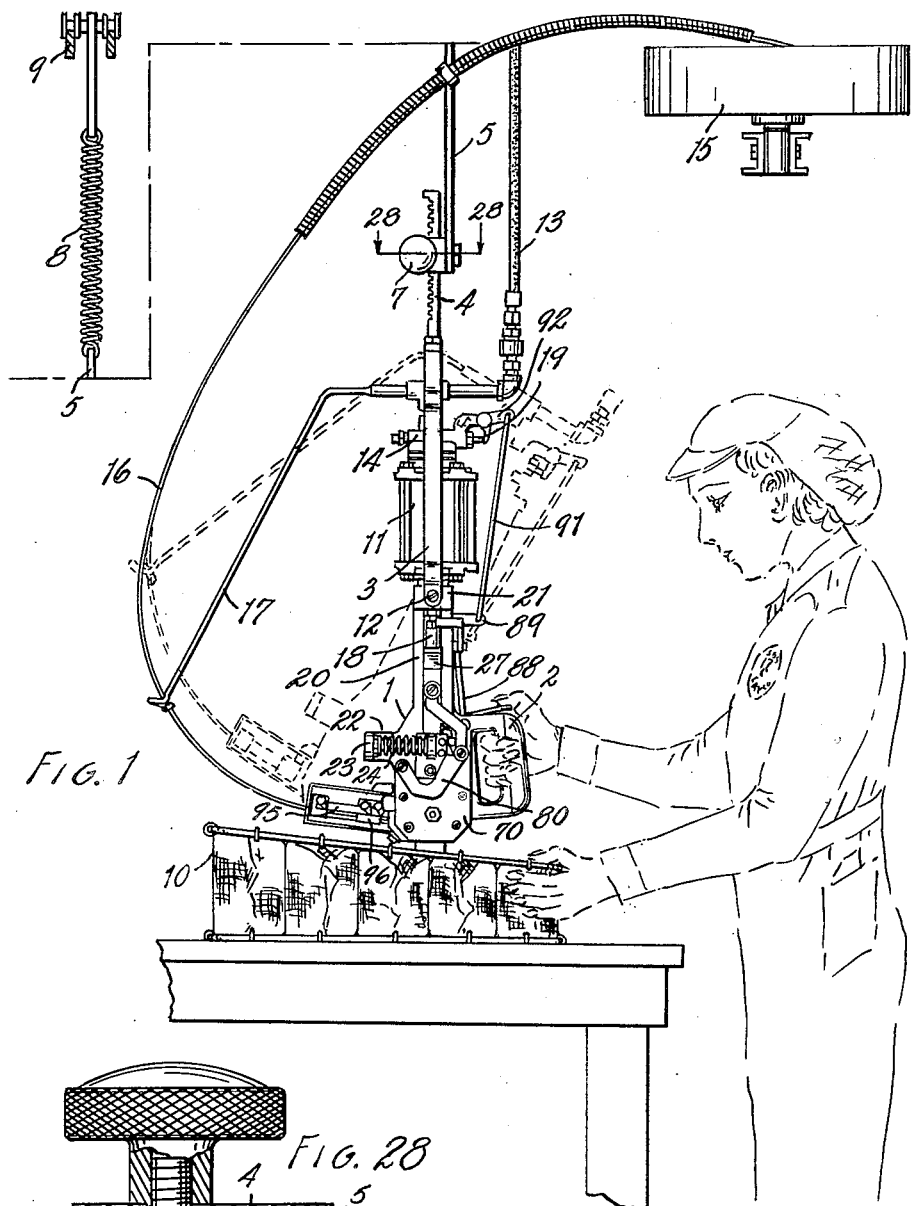
INVENTORS.
ANTHONY LENART
BY BERNARD HEILMAN
ATTORNEY

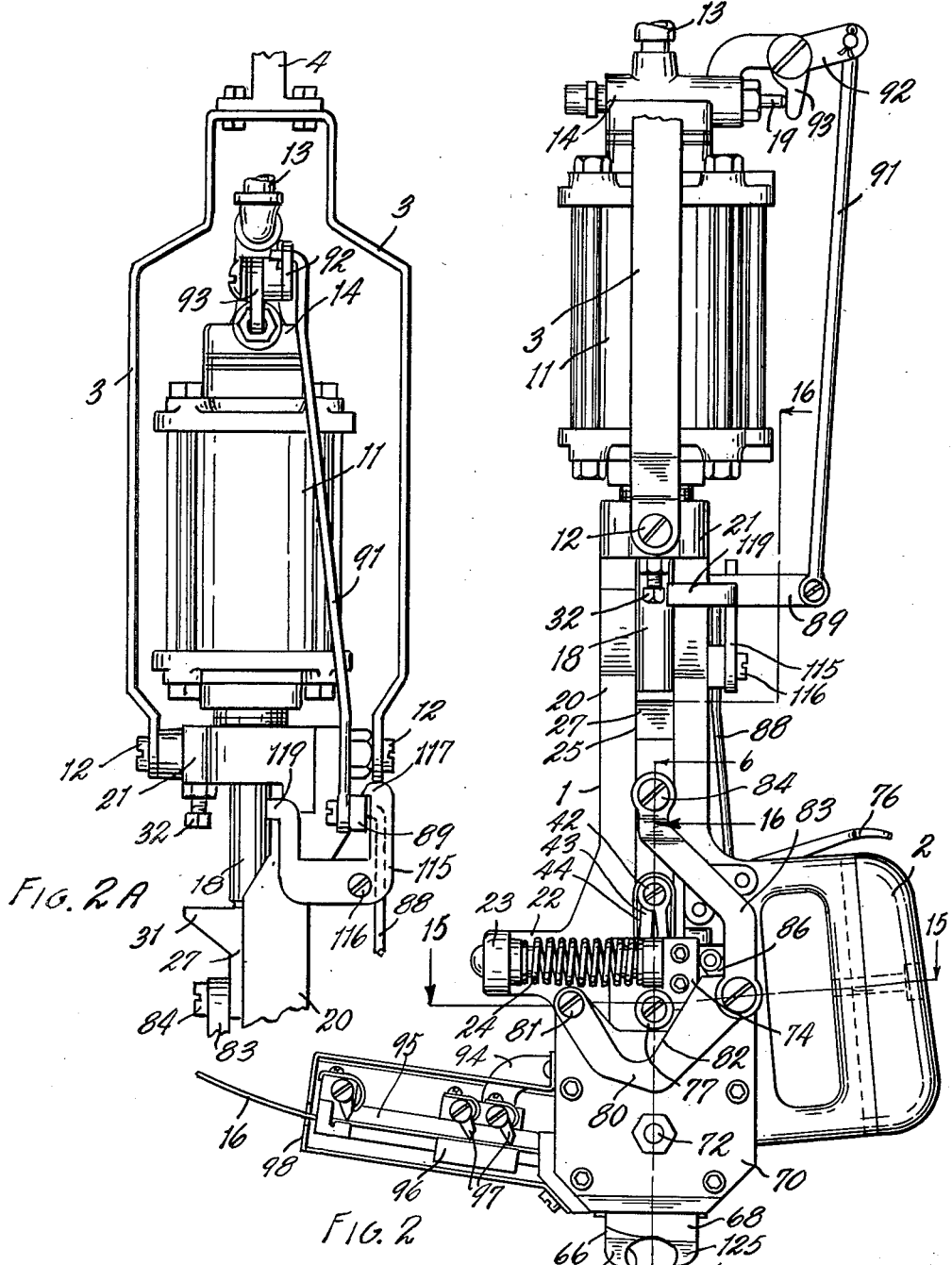

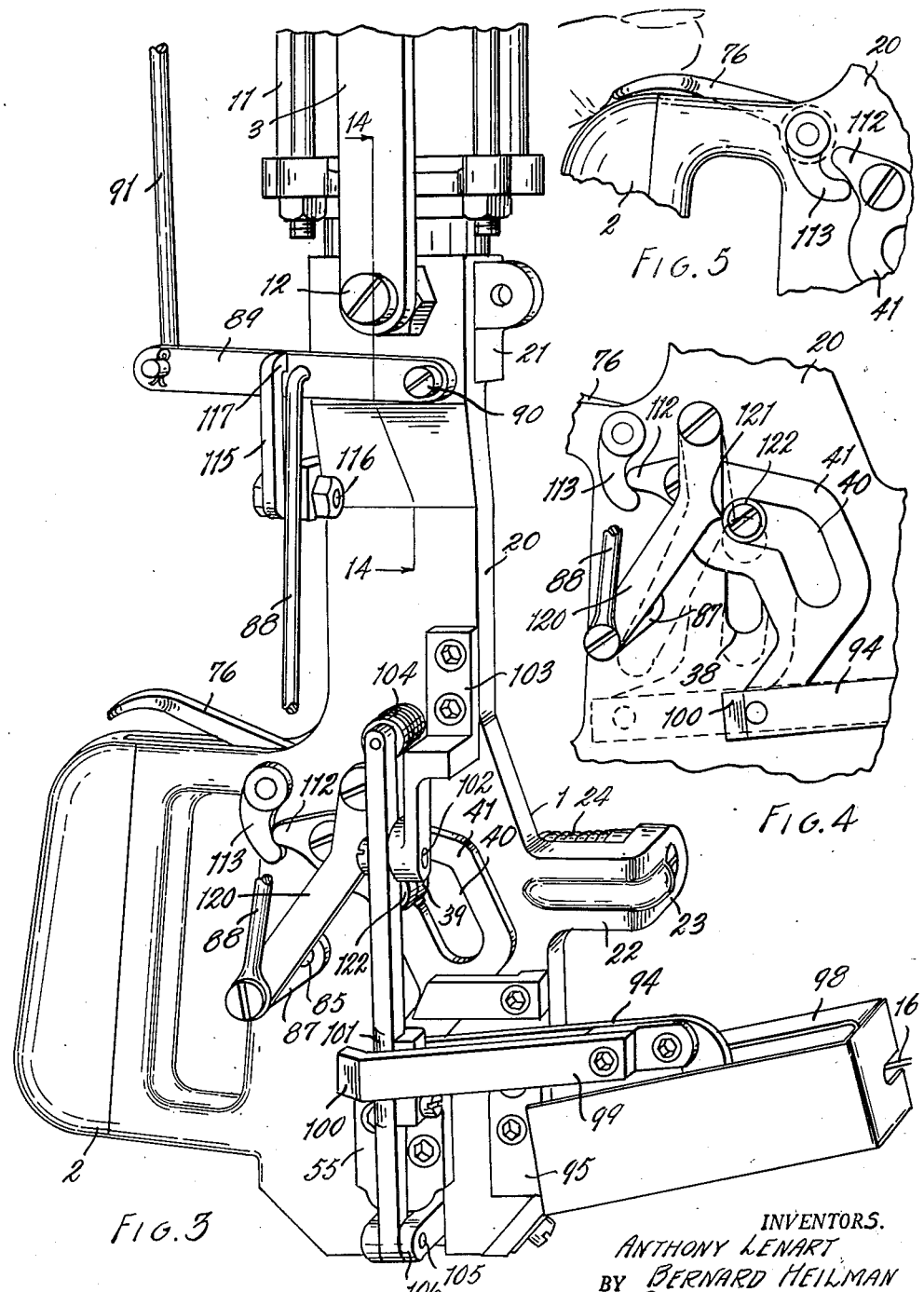

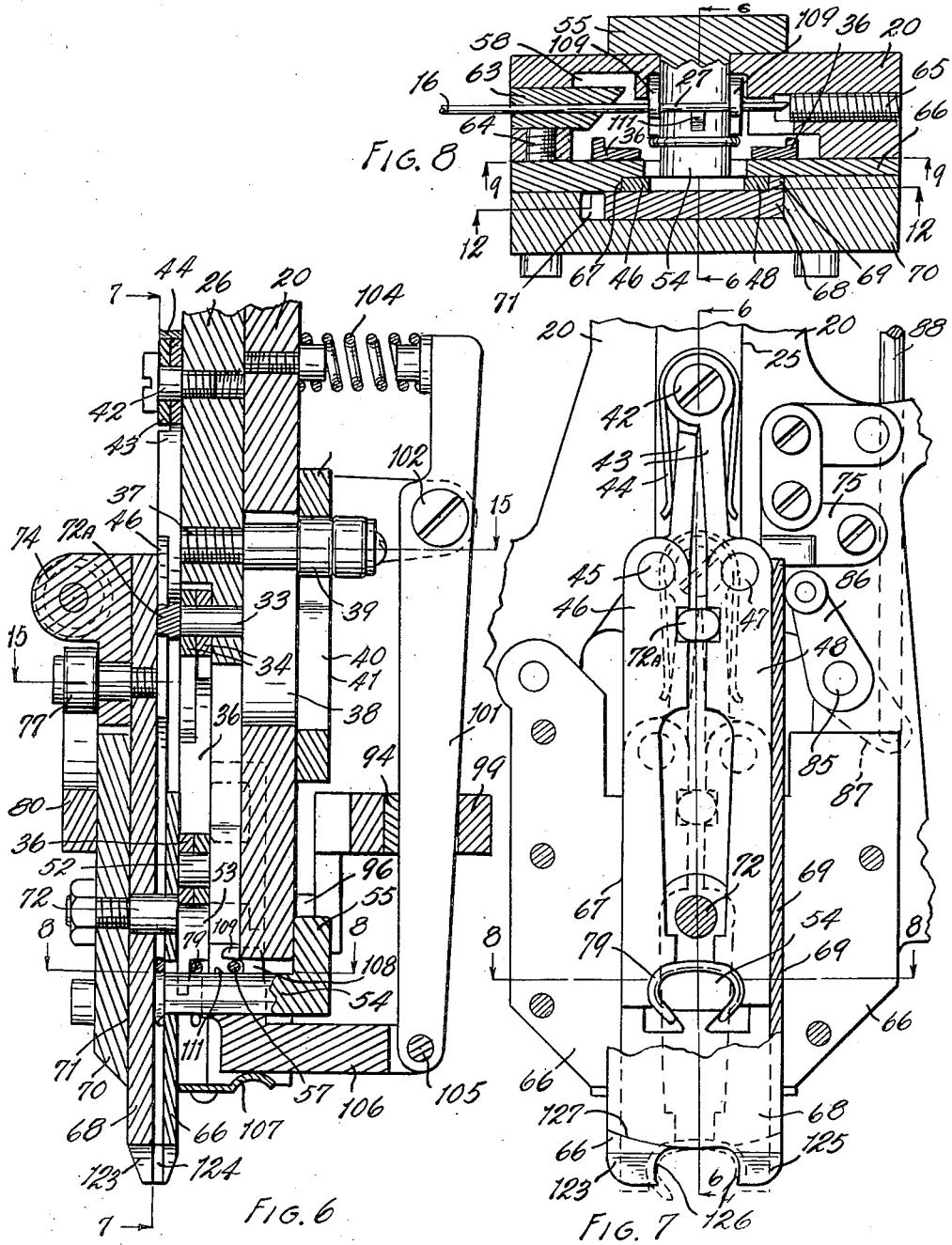

Oct. 21, 1952 A. LENART ET AL 2,614,254
CLIP FORMING AND APPLYING MACHINE
Filed March 5, 1947 10 Sheets-Sheet 5

INVENTORS.
ANTHONY LENART
BY BERNARD HEILMAN
ATTORNEY

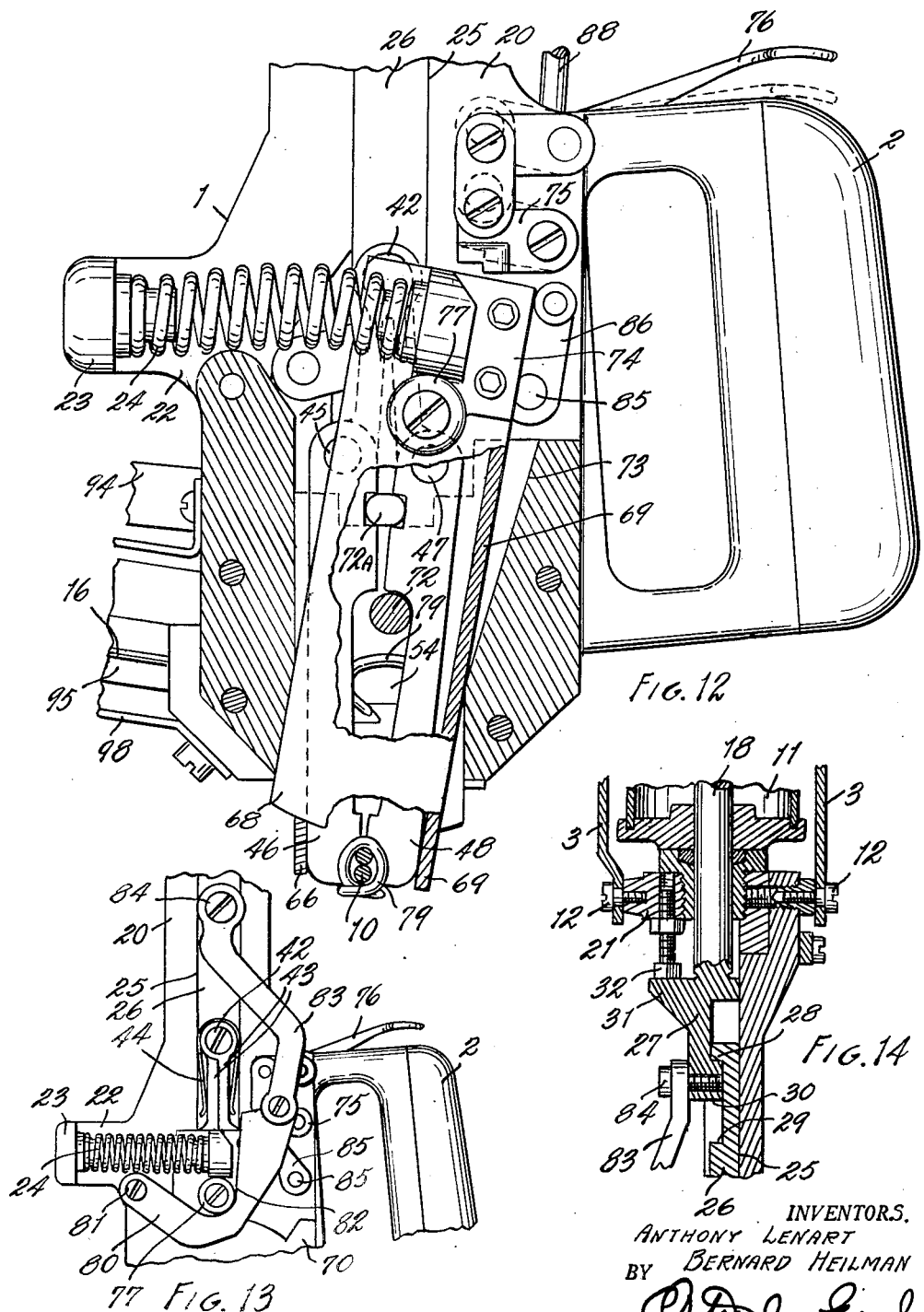

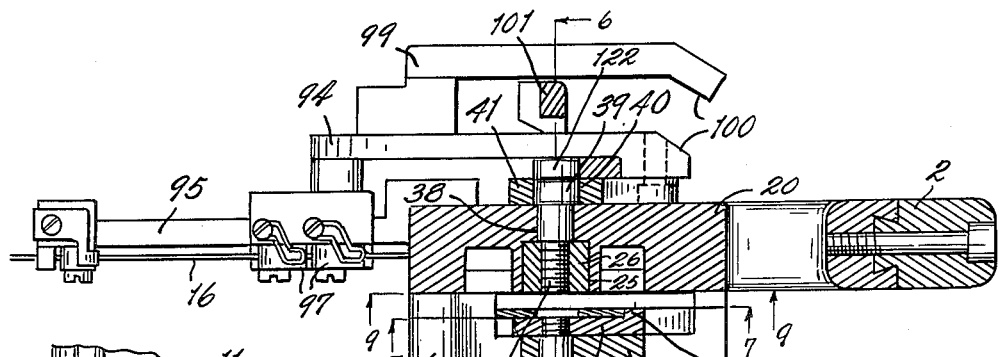
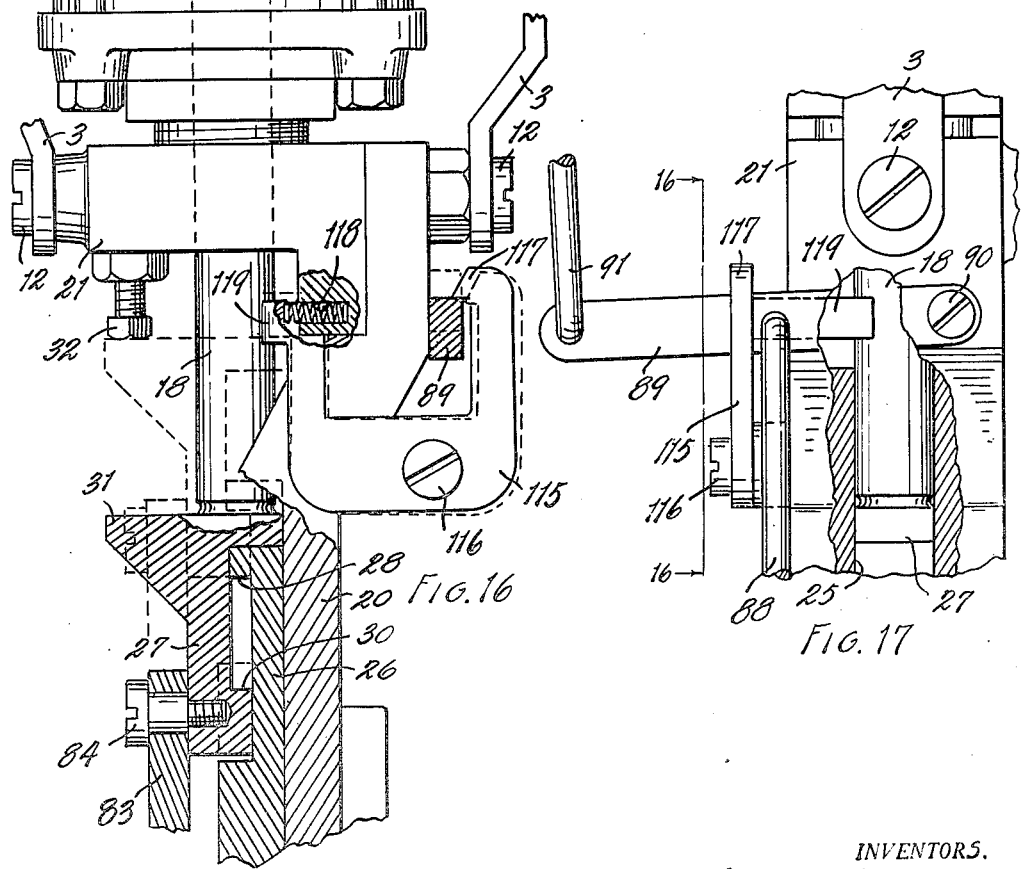

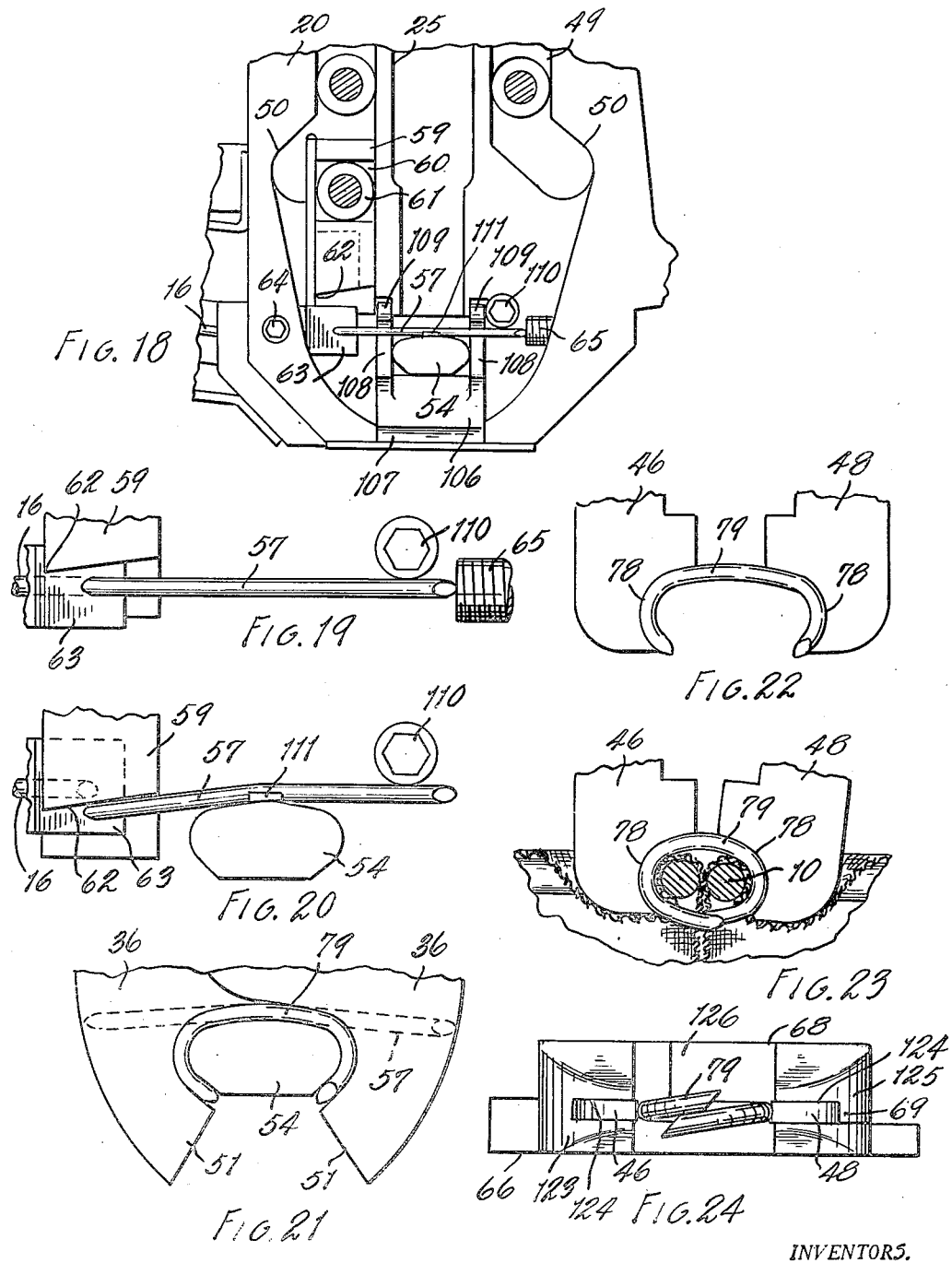

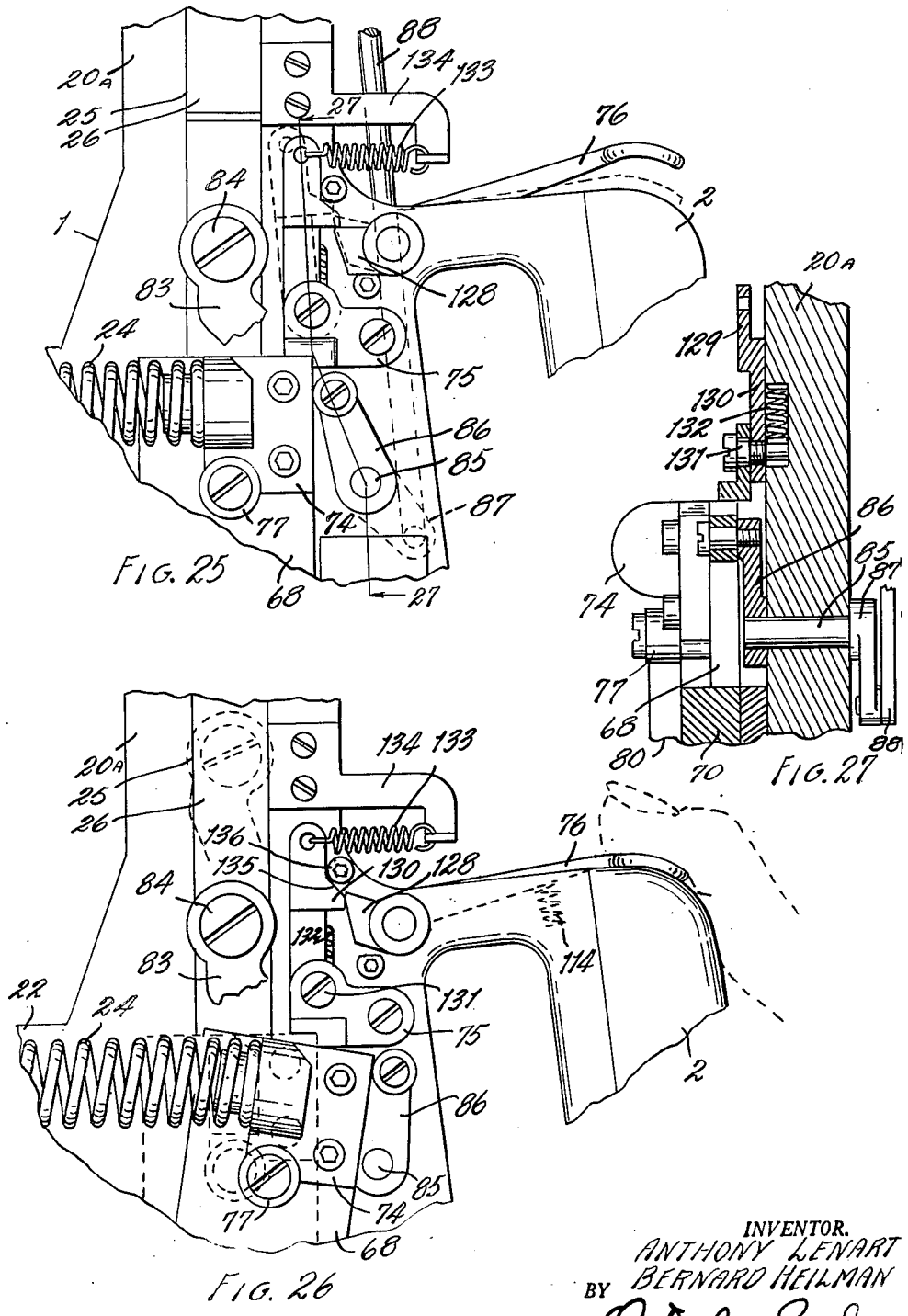

UNITED STATES PATENT OFFICE 2,614,254

CLIP FORMING AND APPLYING MACHINE

Anthony Lenart and Bernard Heilman, Detroit, Mich., assignors to L. A. Young Spring & Wire Corporation, Detroit, Mich.

Application March 5, 1947, Serial No. 732,524

19 Claims. (Cl. 1—177)

This invention relates to improvements in a clip forming and applying machine.

The principal objects of this invention are:

First, to reduce the time and labor required to assemble the spring, frame members and other elements of spring assemblies and the like by providing a power operated machine for forming and attaching the connecting clips.

Second, to provide a machine which will automatically cut off and shape clips from a continuous bail of stock and automatically close the clips around two or more elements to be connected to hold the elements in the desired relative positions.

Third, to provide a machine that will cut, form and close the clips utilizing the power of a two-cycle air motor.

Fourth, to provide a machine for cutting, forming and closing clips that will feed the stock, cut off a desired length of stock and form the clips on one stroke and store energy for closing the clips and advance the clips through various stages of formation on another stroke.

Fifth, to provide a machine with spring actuated jaws for closing clips around a pair of members to be connected in which the closing of the jaws acts to automatically set in operation a motor for cutting, forming and advancing another clip to the closing jaws and re-setting the closing jaws for another operation.

Sixth, to provide a machine for cutting, shaping and attaching clips which may be conveniently supported and operated with a minimum of effort in a plurality of positions relative to a work piece such as a spring cushion assembly.

Seventh, to provide interlocking mechanism between the manual control and automatic controls of a clip blank cutting, forming and closing machine so that the machine will complete a cycle of operation after one actuation of the manually operated control regardless of later unintentional actuations of the manual control.

Eighth, to provide a modified form of interlocking mechanism between the manual control lever and the automatic control mechanism of a machine of the type described which prevents repeated operation of the machine without positive and intentional reactuation of the manual control lever after the machine has completed a full cycle of operation.

Ninth, to provide advancing mechanism in a clip cutting, forming and closing machine for advancing a piece of wire successively from a cut-off position to a forming position and to a closing position.

Tenth, to provide a modified form of operator's grip for a machine of the type described which permits the operator's hand and wrist to assume a natural and comfortable position in a plurality of positions of the machine.

Eleventh, to provide control cams and linkage for the valve of an air motor associated with clip cutting, forming and closing jaws which will actuate the valve and air motor to automatically complete a full cycle of operation of the several jaws.

Other objects and advantages pertaining to the economies and details of the invention will be apparent from the following description and claims.

The drawings, of which there are ten sheets, illustrate a preferred and two modified forms of our clip forming and applying machine.

Fig. 1 is a left side elevational view of our machine in operative position, a portion of the supporting structure being broken away and offset from the main view of the machine.

Fig. 2 is an enlarged fragmentary left side elevational view of the forming and applying portion of the machine shown in Fig. 1 and illustrating the machine in cocked or starting position.

Fig. 2A is a fragmentary front elevational view of the air motor and mechanism shown in Fig. 2.

Fig. 3 is a fragmentary perspective view from the right rear side of the mechanism shown in Fig. 2.

Fig. 4 is an enlarged fragmentary elevational view of the right side of the machine illustrating the stock feed and valve operating levers and cams in the middle of a cycle of operation, the position of the levers and cams at the end of a cycle being indicated in dotted lines.

Fig. 5 is an enlarged fargmentary right side elevational view of the manually operated control and control lock in actuated position.

Fig. 6 is a fragmentary transverse vertical cross sectional view along the line 6—6 in Figs. 2, 7 and 8 and illustrating the mechanism near the end of the retracting stroke of the air motor and just prior to actuation of the clip advancing mechanism.

Fig. 7 is a fragmentary left side elevational view of the mechanism shown in Fig. 6 with the cover plate and cocking levers removed and with a portion of the closing jaw actuating member broken away in cross section to illustrate the closing jaws in open position in the same phase of the cycle of operation as in Fig. 6.

Fig. 8 is a horizontal cross sectional view along the line 8—8 in Figs. 6 and 7.

Fig. 12 is a fragmentary left side elevational view of the machine similar to Fig. 7 but with the cover plate in cross section and illustrating the hog ring closing jaws and actuating member being broken away to illustrate the relative positions of the closing jaws.

Fig. 13 is a fragmentary left side elevational view of the machine at the end of the retracting stroke of the air motor.

Fig. 14 is a fragmentary transverse vertical cross sectional view along the line 14—14 in Fig. 3 illustrating the connection between the air motor and the clip forming mechanism with the air motor in raised or retracted position as at the middle of a cycle of operation.

Fig. 15 is a horizontal cross sectional view along the line 15—15 in Figs. 2 and 6 and illustrating the mechanism at an intermediate phase in the cycle of operation.

Fig. 16 is a fragmentary front elevational view similar to Fig. 2A and partially broken away in vertical cross section to illustrate the connections between the air motor and the clip forming mechanism at the beginning of a cycle of operation.

Fig. 17 is a fragmentary right side elevational view partially broken away in vertical cross section illustrating the valve operating and lock mechanism shown in Fig. 16.

Fig. 18 is a fragmentary left side elevational view of the mechanism with the cover plate, closed jaws and forming jaws removed and illustrating the cut-off and advancing mechanism at an intermediate phase in the cycle of operation.

Fig. 19 is an enlarged fragmentary elevational view of the cut-off mechanism shown in Fig. 18 with the shear member in partially advanced position.

Fig. 20 is an enlarged fragmentary elevational view similar to Fig. 19 but illustrating the shear member at the completion of a cut-off operation.

Fig. 21 is a fragmentary enlarged left side elevational view of the forming jaws in closed position with a clip formed therein and with a blank as shown in Fig. 20 in position behind the jaws.

Fig. 22 is a fragmentary left side elevational view of the closing jaws in open position with a clip in position therebetween.

Fig. 23 is a fragmentary elevational view of the closing jaws shown in Fig. 22 in closed position with a clip therebetween closed around adjacent portions of coil springs which are connected by the clip.

Fig. 24 is a bottom view of the closing jaws in closed position with a clip therebetween.

Fig. 25 is a fragmentary left side elevational view of a modified form of trigger locking mechanism applied to our machine and in cocked or starting position.

Fig. 26 is a fragmentary side elevational view of the mechanism shown in Fig. 25 with the manual control lever and the closing jaw member in actuated position.

Fig. 27 is a fragmentary cross sectional view along the broken line 27—27 in Fig. 25.

Fig. 28 is a cross sectional view through the supporting mechanism of our machine along the line 28—28 in Fig. 1 and illustrating the vertical adjusting mechanism of our machine.

Figure 9:
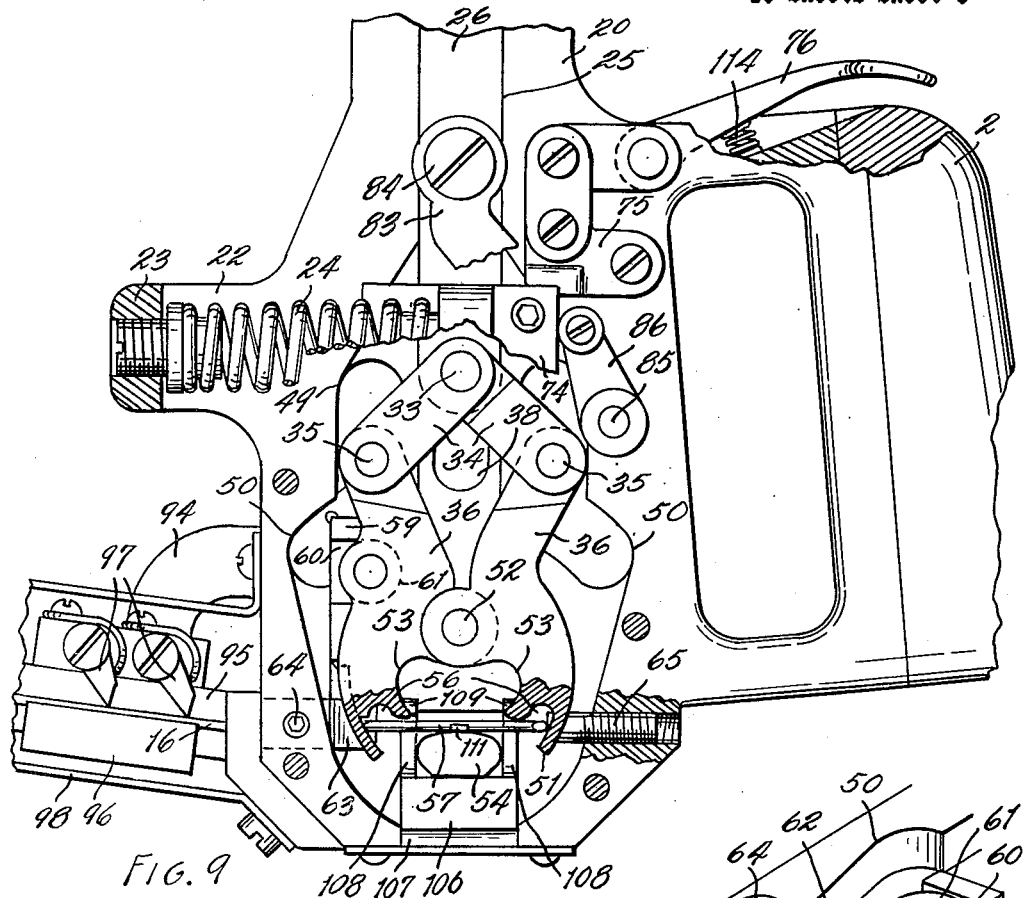
Fig. 9 is a fragmentary left side elevational view of the mechanism illustrated in Figs. 2 and 7 with the cover plate and closing jaws removed to illustrate the clip forming jaws in open position and in the same phase of the cycle of operation, portions of the forming jaws and grip member being broken away in cross section to illustrate the details of construction thereof.

The embodiment of our invention illustrated is designed primarily for use in the manufacture of cushion spring assemblies in which coil springs are joined to adjacent springs or to frame or base or other supporting parts or elements. In the past it has been the practice to connect various elements of such structures by means of clips formed of wire or sheet metal or strip stock. The machine illustrated is an adaptation of our invention for the forming of clips from wire stock, such clips being quite commonly known or designated in the industry as "hog rings," probably due to their preformed partially closed shape resembling hog rings.

It has also been the common practice to apply these clips by means of plier-like tools and it requires a considerable amount of effort to close the clips and in view of the large number to be applied, the work is severe or arduous. In addition to that, a large amount of time is consumed in sorting the clips which become entangled and in placing them in the tools and in adjusting the tools and clips to the parts to be connected. As stated, we have illustrated our invention as embodied in a machine for forming and applying wire clips and we have described the stock as being of wire but it should be understood that the stock may be flat stock of varying gauge and width; that is, that various features of our invention are desirable for embodiment in the forming and application of clips formed of flat or ribbon stock.

Our invention provides a machine which may be conveniently and adjustably supported over a work bench for supporting the parts of the work to be assembled and which will automatically form the clips from stock of the desired shape and gauge and close the clips around the members to be connected utilizing the power of a two-cycle air motor so that very little effort is required on the part of the operator to operate the machine.

As shown in Figs. 1, 2 and 2A our machine consists of a forming and closing device generally indicated at 1 and provided with an operator's handle grip 2 and which is supported by means of a yoke 3 from a rack bar 4. The rack bar extends through a block on the hanger bar 5 and is engaged by teeth on an adjusting shaft 6 provided with hand knobs 7 for adjusting the vertical height of the machine. The hanger bar 5 is preferably connected by a coil spring 8 to suitable supporting rollers and rails 9 so that the entire machine may be moved transversely over the cushion being assembled which is indicated at 10.

The air motor for operating the forming and closing mechanism is indicated at 11 and is positioned between the arms of the yoke 3 and secured to the top of the forming mechanism in a manner which will be more particularly described presently. The yoke is pivotally connected to the upper end of the forming mechanism by means of the screws 12 so that the motor and forming mechanism may be tilted as indicated by the dotted lines in Fig. 1 to reach various portions of the cushion 10. An air hose 13 supplies compressed air to a valve 14 on top of the air motor and a reel support 15 is mounted near the hanger rod 5 for supplying a continuous length of stock 16 to the forming mechanism. A guide rod 17 secured to the top of the valve 14 has its end looped around the stock 16 to guide the stock to the forming mechanism.

The air motor 11 for operating the forming mechanism consists of a cylinder having a piston mounted therein and connected to a piston rod 18 which extends downwardly through the bottom of the cylinder. The valve 14 is a two-position valve spring biased to direct air from the hose 13 to the top of the cylinder to force the piston downwardly. The valve 14 is provided with an actuating pin 19 arranged to reverse the position of the valve and direct air to the bottom of the cylinder to raise or retract the piston and piston rod. The motor in and of itself does not form a part of this invention being available as a commercial product and so is not described in greater detail.

The clip forming and closing mechanism comprises a backing plate 20 which is laterally offset and shouldered at its upper end to receive the mounting block 21 on which the air motor 11 is mounted and through which the piston rod 18 of the air motor extends along the left side of the mounting plate. The pivot screws 12 which support the forming mechanism and air motor on the yoke 3 are connected to the mounting block 21 and to the upper end of the backing plate (see Fig. 14).

The forward edge of the backing plate 20 is extended to form the grip 2 of the machine and the plate is provided with a rearwardly extending arm 22 with an ear 23 on the end thereof extending to the left of the backing plate. The ear 23 serves as an abutment for one end of the closing spring 24 to be described in greater detail presently. The left side of the backing plate defines a vertical channel or groove 25 (see Figs. 2, 13 and 14) in which is slidably mounted a ram 26 and a crosshead 27 secured to the lower end of the piston rod 18.

The upper end of the ram 26 is notched to provide a laterally extending flange 28 on the upper end thereof which is spaced vertically above the shoulder 29 (see Figs. 14 and 16). The crosshead 27 on the end of the piston rod is provided with a mating flange 30 which is reciprocable with the crosshead between the shoulder 29 and flange 28 on the ram 26 to form a lost motion connection between the ram and the crosshead. Thus the first vertical motion of the piston and crosshead in an upward or retracting direction will have no effect on the ram 26 until the flange 30 engages the underside of the flange 28 at which time the crosshead will pick up and raise the ram in the groove 25. Correspondingly, the first downward motion of the piston and crosshead will have no effect on the ram until the upper surface of the notch in the crosshead engages the top of the ram. It will be noted that the crosshead 27 is provided with a projection 31 on the left side thereof arranged to abut against an adjustable stop screw 32 on the underside of the connecting block 21 to limit the upward travel of the piston, crosshead and ram. The dotted lines in Fig. 16 show the crosshead at its upper or retracted limit of travel.

Turning next to the operation and function of the ram 26 attention is invited to Figs. 6, 9, 10 and 15. The ram 26 extends downwardly through the groove 25 in the backing plate 20 and is provided at its lower end with a pivot pin 33. The pin 33 engages the ends of the forming links 34 which have their other ends pivotally connected by the pins 35 to the upper ends of the forming jaws 36. It should be noted that the lower end of the ram 26 is reduced in thickness so that the links 34 lie in the same plane as the ram 26.

Just above the pivot pin 33 for the forming links, the ram 26 is provided with a pin 37 which extends to the right of the ram and through a vertical slot 38 formed in the backing plate 20. (See Fig. 6.) The pin 37 is provided on the right side of the backing plate with a cam roller 39 engaged in the cam slot 40 of a feed cam 41. The operation of the feed cam will be described presently.

Above the pin 37 and on the left side of the ram 26 there is provided a pivot pin 42 which pivotally connects the upper ends of the closing links 43 to the ram. The ends of the closing links are embraced by a U-shaped spring 44 which extends downwardly and engages the sides of the links to urge them to the closed position illustrated in Fig. 7. The lower ends of the closing links 43 are pivotally connected as at 45 to a fixed closing jaw 46 and as at 47 to a movable closing jaw 48. It is thus apparent that upward motion of the ram 26 under the influence of the crosshead 27 and piston 18 will simultaneously raise the ends of the forming links 34 and the closing links 43. This action will close the upper ends of the forming jaws 36 and closing jaws 46 and 48 and also retract both sets of jaws upwardly along the backing plate. Downward motion of the ram will have the reverse effect on both sets of jaws.

Figure 10:
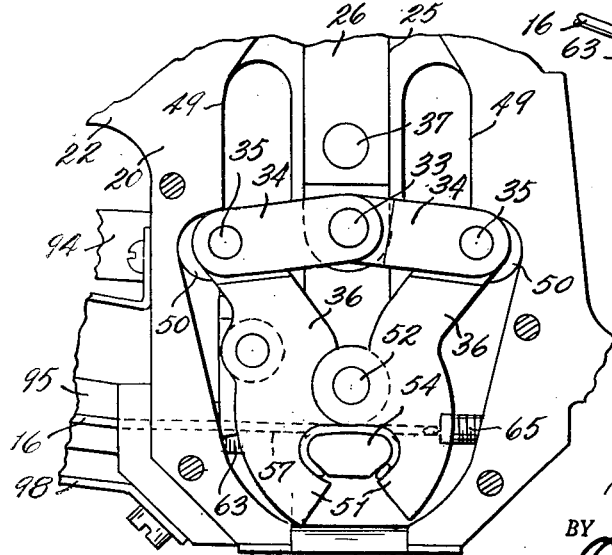
Fig. 10 is a fragmentary left side elevational view similar to Fig. 9 but illustrating the forming jaws in closed operative position as at the end of a cycle of operation.

Turning to the details of construction and mounting of the forming jaws 36 attention is invited to Figs. 8, 9 and 10 in which the backing plate 20 is illustrated as being recessed on its left face with vertical cam grooves 49 located on each side of the ram groove 25 and with laterally extending cam grooves 50. Due to the position of the closing links 34 in the plane of the ram 26, the ends of the closing links and closing jaws are thus positioned within the plane of the backing plate 20 and engageable with the edges of the parallel cam grooves 49 and lateral cam grooves 50. Thus with the first upward motion of the ram 26 from the position illustrated in Fig. 10 the forming links 34 will be drawn upwardly and the upper ends of the forming jaws 36 will be drawn inwardly to separate the tooth portions 51 of the forming jaws, the forming jaws pivoting about the floating connecting pin 52. The ends of the forming jaws and links will then be drawn upwardly in the parallel cam grooves 49, the engagement between the edges of the cam grooves and the forming links maintaining the tooth portions 51 in a constant spaced relation as the forming jaws are moved bodily upwardly or downwardly as shown in Fig. 9.

The tooth portions 51 of the forming jaws 36 are shaped to form opposite concavely curved surfaces 53 which close around an oval shaped mandrel 54 when in closed position as in Fig. 10. The mandrel 54 is mounted on the backing plate 20 and extends therethrough to an attaching flange 55 as is most clearly illustrated in Fig. 8. Below the concave surfaces 53 the tooth portions of the forming jaws are notched as at 56, the notches extending from the right or inner faces of the closing jaws only part way through the ends of the tooth portions. The notches 56 are arranged to receive a blank 57 which is advanced along the top of the mandrel to the left by advancing mechanism to be described presently. In their raised or retracted position the forming jaws are so located that the notches will receive the blank of wire and the nodes between the notches and the concave tooth surfaces 53 will bend down the ends of the wire upon the initial downward movement of the forming jaws. The closing of the forming jaws by extension of the forming links 34 into the lateral cam grooves 50 causes the concave tooth portions 53 to clamp the blank around the mandrel and complete the formation of the clip from the blank.

Figure 11:
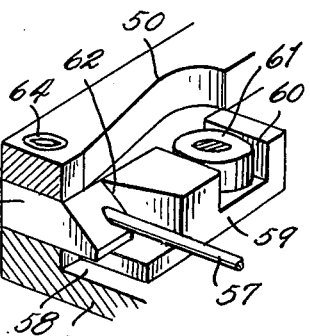
Fig. 11 is a fragmentary perspective view partially in cross section and with the cover plate and jaw members removed to illustrate the position and mode of operation of the cut-off mechanism just prior to the cutting operation.

The backing plate 20 is further relieved or recessed from the plane of the cam grooves 50 underneath one of the forming jaws 36 at 58 as is most clearly shown in Figs. 8 and 11. The recess 58 forms a slot or guide for the cut-off block 59 which is provided with a transverse cam slot 60 engageable with the cam roller 61 rotatably mounted on the right side of the rear closing jaw. The cut-off block 59 is provided with a beveled shear face 62 cooperative with the beveled face of a feed block 63 set in the rear edge of the backing plate 20 and secured in place by the socket headed screw 64. Vertical motion of the forming jaws 36 under the influence of the ram 26 moves the cut-off block 59 with the forming jaws due to engagement of the roller 61 in the cam slot 60. As the shearing face 62 passes over the feed block 63 it will cut off a measured length of the stock to form the blank 57 with beveled ends, the length of the blank being determined by the position of a stop screw 65 extending through the front edge of the backing plate and forming an abutment for the end of the wire as it is fed through the feed block 63.

Turning now to the details of construction and operation of the closing jaws 46 and 48 attention is invited to Figs. 6, 7, 8 and 12. A retaining plate 66 is secured to the left face of the backing plate 20 and retains the forming jaws 36 within the recess portion of the backing plate. The retaining plate 66 is relieved or reduced in thickness along its forward portion forming a vertical abutment 67 for the back of the fixed closing jaw 46. A movable plate 68 having a flange 69 on its forward edge is positioned over the closing jaws 46 and 48 with its rear edge lapped upon the thickened portion of the retaining plate and the flange 69 lapped upon the forward portion of the retaining plate 66. The closing jaws are thus slidably retained between the retaining plate and the movable plate. A cover plate 70 secured to the retaining plate and backing plate supports the movable plate 68 against the left face of the closing jaws and the retaining plate. The cover plate 70 is recessed as at 71 (see Fig. 8) to provide space for the movable plate to rock about a pivot pin 72 which is carried by the cover plate and extends through and is journaled in the retaining plate. The forward edge of the recess 71 is sloped forwardly and upwardly as at 73 (see Fig. 12) so that the movable plate may be rotated about the pivot pin 72. The rear edge of the recess is correspondingly relieved. It will be noted that the adjacent edges of the closing jaws are cut away to provide clearance for the pin 72. 72A is a floating pivot carried by the jaws.

The movable plate 68 carries a stop block 74 at its upper end which is engaged with and has a centering pin for the closing spring 24 so that the spring acts to tilt the movable plate to jaw closing position as shown in Fig. 12. The stop 74 is engageable on its forward edge with the trigger lever 75 link-connected to the manual control lever 76 on the grip 2. The stop block 74 also carries a cocking roller 77 for resetting the movable plate and closing spring in a manner which will be described presently.

In operation of the machine the closing jaws have two general motions. Depression of the manual control lever 76 will disengage the trigger lever 75 from the stop block 74 permitting the closing spring 24 to rotate the movable plate 68 about the pin 72 and against the sloping edge 73 of the recess in the cover plate. The flange 69 of the movable plate will engage the lower end of the movable closing jaw 48 and close the jaw against the fixed closing jaw 46 as shown in Fig. 12. The lower ends of the closing jaws are provided with opposing concave tooth portions 78 which will engage and close a clip 79 about two or more elements of the structure 10 as is shown in Fig. 23. The other motion of the closing jaws caused by vertical motion of the ram 26 and pivot pin 42 acting through the closing links 43 is to draw the jaws 46 and 48 upwardly to the retracted position shown in full lines in Figs. 6 and 7 opposite the end of the mandrel 54 where they will receive a newly formed clip 79 from the forming jaws. Operation of the advancing mechanism which feed the clip into the closing jaws will be described presently.

The movable plate 68 and closing spring 24 are reset or cocked by operation of a cocking lever 80 pivotally mounted on the cover plate 70 at 81. The cocking lever 80 is provided with a cam surface 82 engageable with the cam roller 77 on the movable plate and is connected to the cocking link 83 which has its upper end pivotally connected to the crosshead 27 on the lower end of the piston shaft 18 by means of a pivot pin 84. Due to the lost motion connection previously described between the crosshead 27 and the ram 26, the first upward motion of the piston rod and crosshead will immediately actuate the link 83 and cocking lever 80 to reset the movable plate 68 and compress the spring 24. This allows the closing jaws to open from around the wires of the cushion 10 prior to any vertical movement of the forming jaws or closing jaws. The cocking lever and link are illustrated in raised or retracted position in Fig. 13. Upon release of the movable closing jaw 48 by the movable plate 68, the U-shaped spring 44 will function to collapse the closing links 43 as shown in Figs. 7 and 13 and open the work engaging portions of the closing jaws. Upon completion of the retraction of the movable plate the trigger lever 75 will snap into engagement with the stop block 74 to hold the movable plate and closing spring in cocked position.

Attention is now directed to the valve operating and wire advancing mechanism position primarily on the right hand side of the backing plate and illustrated in Figs. 3, 4, 5, 9, 15, 16 and 17. A small crank pin 85 extends through the forward portion of the backing plate and is provided with one crank arm 86 on the left side of the backing plate which is engaged by the stop block 74 on the movable plate 68 when the plate is rotated by the closing spring 24. The opposite end of the crank pin 85 on the right hand side of the backing plate is provided with a crank arm 87 (see Fig. 3) which is pivotally connected to a first valve operating rod 88. The upper end of the rod 88 is connected to an intermediate point of the valve arm 89 pivotally mounted on the upper end of the backing plate at 90. The free end of the valve arm 89 is connected to a second valve rod 91 which extends upwardly to a valve crank 92 (see Fig. 2) pivotally mounted on the valve 14. The crank 92 is provided with an arm 93 for depressing the plunger 19 to reverse the position of the valve 14 and admit air to the bottom of the cylinder 11.

Thus the first action upon depressing the manual control lever 76 and releasing the trigger lever is for the closing spring to actuate the closing jaws as previously explained and simultaneously for the stop block 74 to actuate the crank arms 86 and 87 and operate the linkage for reversing the valve and the supply of air to the cylinder 11. The piston and piston rod will immediately commence to rise to a retracted position and the crosshead 27 will actuate the cocking link 83 and cam 82 to retract the closing jaws from around the clip just applied and permit the forming jaws and closing jaws to be raised to a retracted position.

Raising of the ram 26 by the crosshead 27 will retract the forming and closing jaws as previously described and will also raise the pin 37 in the slot 38 in the backing plate 20. As previously explained the pin 37 and roller 39 operating in the slotted advance cam 41 will raise the wire advancing cam to the full line position illustrated in Fig. 4. The lower end of the advance cam is pivotally connected to a feed bar 94 which extends to the rear of the machine and is slidably mounted on a guide arm 95 (see Figs. 2, 3 and 9). The feed bar 94 is flanged to the left as at 96 around the underside of the guide bar to support the incoming blank 16 from the stock in the reel 15 and is provided with a series of spring pressed pawls 97 which are inclined toward the forming machine and arranged to slide over the stock as the feed bar is retracted and to grip the stock and advance it into the feed block 63 as the feed bar is advanced toward the forming mechanism. The guide bar 95 and pawls 97 are partially enclosed by a suitable sheet metal guard 98.

The feed bar 94 carries a cam bar 99 which is secured in spaced parallel relationship to the feed bar and both the feed bar and cam bar are provided with cam surfaces 100 at their forward ends which are inclined toward the left side of the backing plate. The cam surfaces 100 are arranged to bear against and actuate the clip advancing lever 101 which is pivotally mounted at 102 on a bracket 103 secured to the right side of the backing plate. A coil spring 104 positioned between the upper end of the advancing lever and the backing plate constantly urges the lower end of the advancing lever toward the backing plate. The lower end of the advancing bar is pivotally connected at 105 in the bifurcated end of the clip advancing dog 106. The advancing dog 106 extends underneath the mandrel 54 and is yieldingly supported by the spring plate 107 secured to the bottom of the backing plate. Parallel arms 108 extend upwardly from each side of the hog ring advance dog along the front and back of the mandrel 54 and are provided with hook portions 109 opening toward the left end of the mandrel.

It will thus be seen that when the feed bar 94 is in its fully retracted position the advance lever 101 and hog ring advancing dog 106 will be advanced toward the left of the backing plate but will be moved to a retracted position shown in Fig. 6 immediately upon the first advancing motion of the wire feed bar 94 and the ram 26. In its retracted position the clip feed dog is aligned with the aperture in the feed block 63 so that the length of wire 57 entering the forming machine will pass between the hook portions 109. All of this motion takes place prior to engagement of the cut-off block 59 with the blank 57 so that the blank is held on the top of the mandrel and against the stop screw 65 by the hooks 109 when the shear face 62 cuts off the blank 57. As is most clearly shown in Figs. 19 and 20, the action of the cut-off block 59 will slightly bend the blank 57 so that the blank will not roll on the mandrel and will maintain the beveled ends of the blank in the position illustrated as it is advanced along the mandrel into the forming jaws. A stop screw 110 is secured to the backing plate on the forward side of the mandrel so that its head restrains upward tilting motion of the blank.

Simultaneously with the cutting off blank 57 the forming jaws 36 will be forming a previously cut blank about the mandrel as previously described and the closing jaws will be advanced to below the backing plate with a previously formed clip positioned therebetween. Upon subsequent retraction or raising of the ram 26 and the jaw members, the clip advancing lever 101 and clip advancing dog 106 will be advanced to the left as just described so that the hooks 109 will advance the newly cut blank 57 to the left along the mandrel to a position within the notches 56 in the forming jaws 36. The left hand edges of the arms 108 will simultaneously engage the previously formed clip and advance the clip along the mandrel to between the open ends of the closing jaws which will be in their fully retracted position opposite the end of the mandrel 54. In order to prevent the newly advanced blank 57 from clinging in the hooks 109 as the clip advancing dog 106 is retracted, a small projection 111 is formed on the top of the mandrel just to the right of the forming jaws 36. The spring 107 pressing upwardly on the bottom of the hog ring advancing member provides the necessary yielding support for the hooks 109 to be raised slightly as the blank passes over the projection. Attention is now called to Figs. 3, 4 and 5 which illustrate the advancing cam 41 as being provided with an ear 112 which is engageable when the cam is in raised or retracted position with a depending ear 113 secured to the end of the pivot on which the manual control lever 76 is mounted. The ears 112 and 113 form a trigger lock which prevents actuation of the manual control lever at any time except when the piston and ram 26 are in lowered or advanced position. Thus it is impossible for the operator to accidentally trip the trigger lever 75 and release the spring 24 while the closed jaws are in retracted or raised position. The ear 112 and advance cam 41 exert a positive returning force to the manually operated control lever 76 and cooperate with the coil spring 114 illustrated in Fig. 9 in returning the control lever to its unactuated position.

A further locking feature which assures that the mechanism will complete a full cycle of operation is incorporated in the mechanism and illustrated most clearly in Figs. 2, 2A, 16 and 17. A U-shaped locking member 115 is pivotally mounted on the upper end of the backing plate 20 at 116 and one arm of the locking member is provided with a hook 117 adapted to slide over and engage the top of the valve arm 89 when the arm is depressed to reverse the position of the valve 14 as previously described. A coil spring 118 positioned between the attaching block 21 and the other arm of the locking member 115 constantly urges the U-shaped member into locking position. As is shown in Fig. 16 the left arm of the locking member 115 is provided with an ear 119 adjacent to the piston rod 18 which is engageable with the upper surface of the crosshead 27 when the crosshead is in fully raised position as shown by the dotted lines in Fig. 16. Thus raising of the ear 119 by the crosshead 27 tilts the hook 117 of the locking member out of engagement with the valve arm 89 and permits the valve arm 89 and valve operating rods 88 and 91 to be raised automatically by action of the lever 120 pivotally mounted on the lower end of the backing plate and connected to the lower end of the valve rod 88. The lever 120 as shown in Fig. 4 is provided with a cam surface 121 which rides against the roller 122 carried on the end of the pin 37. When the pin 37 is raised by the ram 26 to raise the wire advance cam 41, the roller 122 will engage the cam surface 121 to throw the lever 120 forwardly and raise the valve rods 88 and 91 at the top of the stroke of the piston. The action of the lever 120 and cam roller 122 thus automatically reverses the valve 14 and the action of the piston at the top of its stroke. The movement of the lever 120 and arm 87 by the cam roller 122 also resets the arm 86 on the left side of the backing plate for a succeeding actuation by the stop 74.

A complete cycle of operation of the machine from a starting position with the closing spring 24 and movable plate 68 in the cocked position shown in Fig. 2 and with a formed clip between the closing jaws in lowered or advanced position starts with actuation of the manual control lever 76 which releases the trigger lever 75 permitting the closing spring to close the clip in the closing jaws and actuates the crank arms 86 and 87 to depress the valve rods 88 and 91 and valve arm 89 so that compressed air is admitted to the bottom of the cylinder 11, the locking member 115 engaging the valve arm 89 to hold the valve in reverse position as previously described. Immediately upon vertical raising motion of the piston and crosshead, the cocking lever 80 acting through the movable plate will open the closing jaws and reset the closing spring 24. The lost motion connection between the crosshead and the ram 26 will then be closed and continued rise of the crosshead will lift the ram 26. Retraction of the ram will open the forming jaws 36 from around the mandrel leaving a completed clip clamped around the mandrel and will retract both the forming jaws and closing jaws upwardly along the backing plate. Simultaneously the pin 37 and roller 39 will actuate the advancing cam 41 to move the wire advance bar 94 to the rear, the pawls 97 sliding on the stock 16. At the top of the stroke of the piston the cam surfaces 100 on the wire advance bar 94 and guide bar 99 will actuate the advance lever 101 to move the clip advancing dog 106 to the left along the mandrel. The left edges of the arms 108 will move the previously formed clip into the open tooth portions 78 of the closing jaws 46 and 48 and the hook portions 109 will move a previously cut blank into the forming jaws 36. At the top of the stroke of the piston the pin 37 and roller 122 will actuate the lever 120 and valve control rods to reverse the position of the valve and start the down stroke of the piston. The first downward movement of the ram and pin 37 will immediately retract the clip advancing dog out of the way of the forming jaws and will cause the wire advance cam and feed bar 94 to feed a new length of wire 57 into the recessed portion of the backing plate. Continued downward motion of the ram will cause the forming jaws and closing jaws to be advanced downwardly, the closing jaws projecting below the backing plate where they may be engaged with the cushion 10. The forming jaws move downwardly carrying the cut-off block 59 with them and shearing off the blank 57. At the lower end of the descending stroke of the piston, the forming links 34 separate into the cam slots 50 in the backing plate to close the forming jaws around the previously cut blank and forming a new clip around the mandrel. The cycle of the machine is thus completed and ready to be repeated upon a second actuation of the manual control lever 76. It will be noted that in its rest position the cylinder 11 is supplied with compressed air on its upper end so that the jaws, particularly the closing jaws, are held firmly down so they can be used to pick up element of the structure being assembled by movement of the whole machine.

The lower ends of the retaining plate 66 and movable plate 68 are extended to provide lateral support for the tooth portions of the closing jaws in their extended position. Figs. 6, 7 and 24 show the retaining plate to be provided with an extension 123 which is slotted at 124 to slidably pass the lower end of the fixed closing jaw 46. The movable plate 68 and its flange 69 extend downwardly as at 125 and lap upon the extension of the retaining plate. Both extensions are provided with concave surfaces 126 which form an oval opening slightly smaller than the tooth portion of the closing jaws in their open position. The sides of the projections thus engage the sides of the clip 79 in the closing jaws and prevent its accidental dislodgement as the machine is moved to engage the clip with the members of the cushion to be connected. It will be noted from Fig. 24 that the beveled ends of the clip cause the ends to easily overlap as they are brought together by the closing jaws. The projection on the retaining plate is cut off on its upper side along an arcuate line 127 (see Fig. 7) so that the movable plate may be rotated over it.

Figs. 25, 26 and 27 illustrate a modified form of manual control and trigger lock-out mechanism which prevents the machine from operating in a fully automatic fashion should the operator unintentionally or negligently hold the manual control lever in a depressed position for a longer period of time than is required for the machine to complete a single cycle. In this form of the invention the manual control lever 76 is directly connected to a dog 128, the nose of which is engageable with the underside of the offset portion 129 of a trigger link 130. The lower end of the trigger link 130 is pivotally connected by the pin 131 to the trigger lever 75 which is the same as in the preferred form of the invention. A coil spring 132 positioned in a recess in the backing plate 20A and bearing against the inner end of the pin 131 operates to urge the trigger link and trigger lever downwardly to a cocked position.

The upper end of the trigger link 130 is constantly urged forwardly by a coil spring 133 connected between the offset portion 129 and a bracket 134 secured to the backing plate. The offset portion 129 is provided with a forwardly sloping surface 135 which is arranged to bear against the head of a socket screw 136 secured to the backing plate. As is indicated by the dotted lines in Fig. 25, depressing the manual control lever 76 will cause the nose of the dog 128 to lift upwardly on the trigger link 130. Engagement of the sloping surface 135 with the screw head 136 causes the upper end of the trigger link to be forced backwardly extending the coil spring 133. As the trigger link tilts backwardly the dog 128 will slide off from underneath the overhanging portion 129 of the trigger link permitting the coil spring 132 to urge the trigger link and trigger lever downwardly to the cocked position. Upward motion of the trigger link and the trigger lever 75 prior to disengagement of the dog 128 is sufficient to disengage the trigger lever 75 from the stop member 74 to set the machine in operation as in the preferred form of the invention. The tripping of the trigger lever 75 is practically instantaneous during the operator's motion in depressing the manual control lever 76. When the trigger link and trigger lever are released by full depression of the control lever and escape of the dog 128 from under the trigger link, the trigger lever will snap down on top of the stop member 74, as is shown in Fig. 26. Thus should the operator unconsciously hold the manual control lever 76 in depressed position completely through a cycle of the operation of the machine, the stop member 74 will return to locked engagement with the trigger lever 75 without re-engaging the dog 128 with the trigger link and the machine will come to rest in a cocked position. In order to restart the machine, the operator must intentionally release the manual control lever 76 so that the coil spring 114 can rotate the control lever and dog 128 until the nose of the dog snaps underneath the offset portion 129 of the trigger link at which time the trigger mechanism will again be operative. The yielding action of the coil spring 133 permits the trigger link to be tilted sufficiently to clear the nose of the dog without affecting the cocked position of the trigger lever 75. In other respects the modified form of the machine operates in the same manner as the preferred form previously described.

Figure 29:
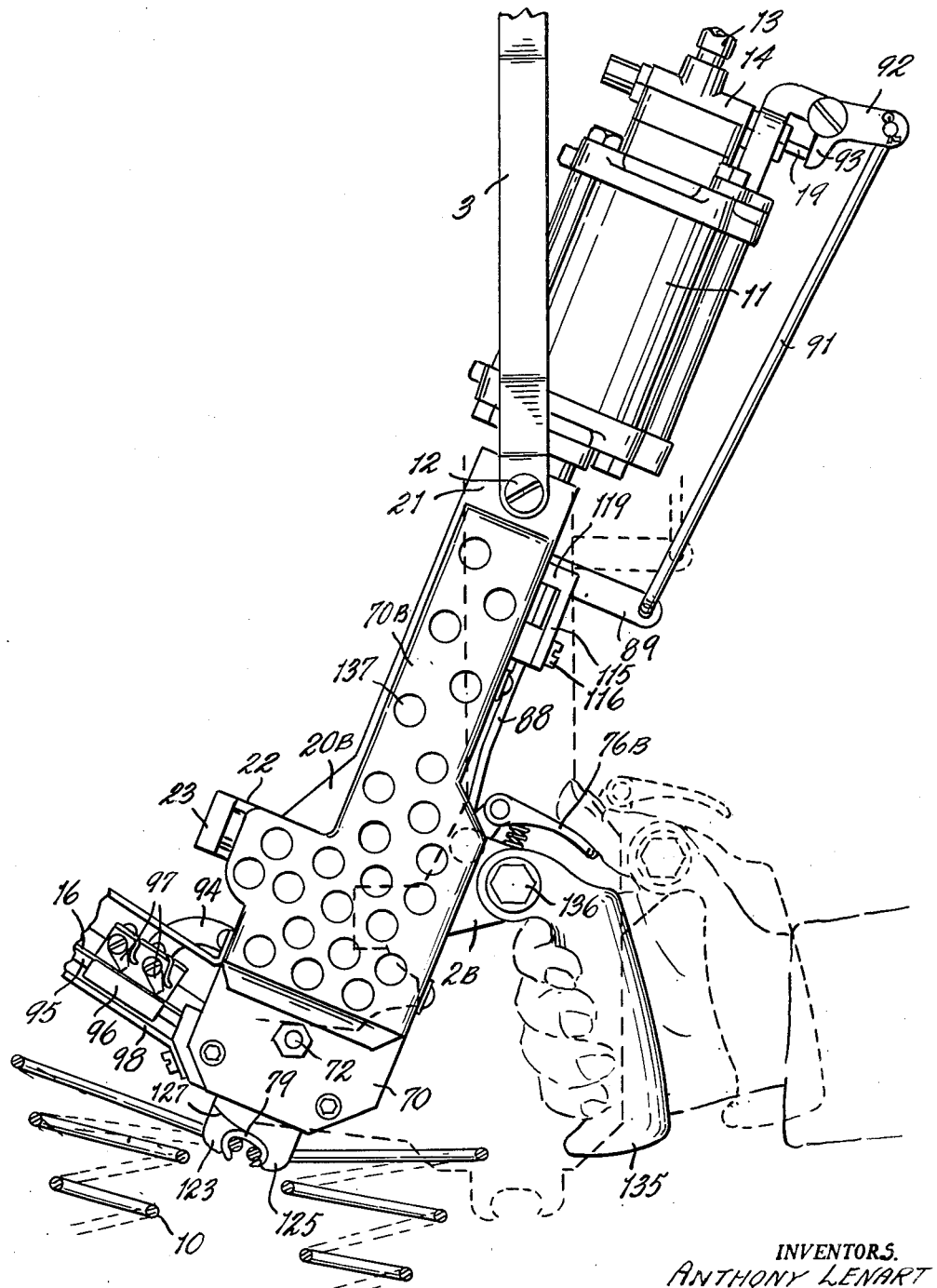
Fig. 29 is a fragmentary left side elevational view of a further modified form of our machine at the beginning of a cycle of operation.

Fig. 29 illustrates a further modified form of our forming and attaching mechanism in which the backing plate 20B is provided with a forwardly extending ear 2B in place of the integrally formed grip in the preferred form of the invention. A separate grip member 135 is pivotally secured to the ear 2B and may be adjustably clamped thereto in a plurality of angular positions by the bolt 136 so that the grip may be positioned in a convenient and comfortable position for the operator regardless of the angular position of the backing plate 20 relative to the hanger bar 3. The manual control lever 76B is pivotally mounted above the ear 2B so as to be readily accessible in any position in the grip 135. With this form of grip the machine may be adjusted for the comfort of the operator so that it may be used in any angular position without requiring the operator to continually bend his hand and wrist. This form of the machine is further provided with a modified form of cover plate 70B which has been cut away in a series of holes 137 to lighten the plate so that the backing plate and forming mechanism will be balanced with the pneumatic motor 11 about the pivot pins 12.

All forms of the invention just described operate to quickly and easily connect the various parts of a seat cushion with metal clips which are simultaneously formed in the machine from a continuous coil of wire. The machine requires little effort on the part of the operator and no previous forming and sorting of the clip. The machine thus greatly reduces the amount of time and labor required to fabricate a seat cushion and is provided with the necessary interlocking mechanism between the manual control and the automatic controls to prevent the machine from becoming jammed or from operating automatically without the operators intentional actuation of the manual control lever.

In the description of the various forms of the invention it will be appreciated that the terms "left" and "right" side, "raised" and "lowered," and "front" and "rear" have been used for convenience in description and in following the function and position of the several parts. Obviously the relative position of many of the parts could be reversed without departing from the theory of the invention.

We have described three highly practical forms of our invention so that others may reproduce the same with such minor modifications as are desired without further disclosure.

Having thus described our invention, what we claim as new and desire to secure by Letters Patent is:

1. A clip forming and attaching machine comprising a backing plate having a pneumatic motor mounted on one end thereof and with a grip carried on the other end thereof, a mandrel carried by said plate and projecting transversely from the lower end thereof, forming jaws carried on said backing plate and reciprocably driven by said motor to cut off a clip blank from a strip of stock and to form a previously cut blank into a clip about said mandrel upon the advancing stroke of said motor, means actuated by retracting motion of said forming jaws to advance the blank and clip formed thereby transversely along said mandrel, closing jaws carried on said backing plate and reciprocably driven by said motor to receive a previously formed clip from the end of said mandrel in the retracted position of said closing jaws and motor and advance said clip below said backing plate into engagement with members to be connected upon advancing motion of said motor, a spring carried by said backing plate and adapted to close said closing jaws and clip about the members to be connected, a manually operative control lever adjacent said grip for releasing said spring, a valve for said motor normally biased to admit air to advance said motor, a valve control member for reversing the position of said valve and admitting air to retract said motor and arranged to be actuated by movement of said spring to released position, and a spring-pressed lock member carried on said backing plate arranged to lock said valve control member in actuated position, said lock member having a portion engageable with a portion of said motor in the retracted position thereof to disengage said lock member from said control rod.

2. A clip forming and attaching machine comprising a backing plate having a motor mounted on one end thereof and with a grip fixed on the other end thereof, a mandrel carried by said plate and projecting transversely from the lower end thereof, forming jaws carried on said backing plate and reciprocably driven by said motor to sever a blank from a length of stock and form the blank into a clip about said mandrel upon advancing stroke of said motor, means actuated by retracting motion of said forming jaws to advance the blank and clip formed thereby transversely along said mandrel, closing jaws carried on said backing plate and reciprocably driven by said motor to receive the clip formed by said forming jaws in the retracted position of said closing jaws and motor and advance said clip to below said backing plate into engagement with parts to be connected upon the advancing stroke of said motor, a spring carried by said backing plate and adapted to close said closing jaws and clip about the parts to be connected, a manually operative control lever mounted adjacent to said grip for releasing said spring, a valve for said motor normally biased to admit air to advance said motor, a valve control member arranged to reverse the position of said valve and admit air to retract said motor, said valve control member being arranged to be actuated by movement of said spring to released position, a support member pivotally supporting said backing plate with said grip over-balanced to hang below said motor, and a yielding support for said support member whereby said closing jaws may be moved into engagement with said parts by light pressure on said grip.

3. A clip forming and attaching machine comprising a backing plate having a pneumatic cylinder provided with a piston mounted on one end thereof and with a grip fixed on the other end thereof, forming jaws carried on said backing plate and adapted to sever a clip blank from a strip of stock and to form a previously cut blank into a clip upon advancing stroke of the piston of said cylinder, closing jaws carried on said backing plate and adapted to receive a clip previously formed by said forming jaws in the retracted position of said cylinder and advance said clip to below said plate upon advancing motion of the piston of said cylinder into engagement with parts to be connected, a spring carried by said backing plate and adapted to close said closing jaws and clip about the parts to be connected, a manually operative control lever for releasing said spring, a valve for said cylinder arranged to admit air to the upper end thereof, a valve control rod arranged to reverse the position of said valve and admit air to the lower end of said cylinder, a crank member carried on said backing plate and having one arm arranged to be actuated by the release of said spring and another arm arranged to actuate said control rod, a spring-pressed lock member carried on said backing plate arranged to lock said control rod in actuated position, said lock member having a portion engageable with the piston of said cylinder in the retracted position thereof to disengage said lock member from said control rod, and a cam carried on said backing plate operatively connected to said valve control rod, said cam having an operative connection with the piston of said cylinder to exert a restoring force to said valve control rod to return said valve to piston advancing position at the top of the retracting stroke of said piston.

4. A clip forming and attaching machine comprising a backing plate having a pneumatic cylinder provided with a piston mounted on one end thereof and with a grip carried on the other end thereof, a mandrel carried by said plate and projecting transversely from the lower end thereof, forming jaws carried on said backing plate and reciprocably driven by said piston to form a clip blank and sever the blank into a clip about said mandrel upon advancing stroke of the piston of said cylinder, means actuated by retracting motion of said forming jaws to advance the blank and clip formed thereby transversely along said mandrel, closing jaws carried on said backing plate and reciprocably driven by said piston to receive the clip formed by said forming jaws in the retracted position of said piston and advance said clip upon advancing motion of the piston of said cylinder into engagement with parts to be connected, a spring carried by said backing plate and adapted to close said closing jaws and clip upon the parts to be connected, a manually operative control lever for releasing said spring, a valve for said cylinder normally biased to admit air to the upper end thereof, a valve control rod arranged to reverse the position of said valve and admit air to the lower end of said cylinder, a crank member carried on said backing plate and having one arm arranged to be actuated by movement of said spring to released position and another arm arranged to actuate said control rod, and a cam member carried on said backing plate operatively connected to said control rod, said cam member having an operative connection with the piston of said cylinder in the retracted position thereof to exert a restoring force to said control rod.

5. A clip forming and attaching machine comprising a backing plate having a pneumatic cylinder provided with a piston mounted on one end thereof and with a grip fixed on the other end thereof, forming jaws carried on said backing plate and adapted to sever a blank and form the blank into a clip upon the advancing stroke of the piston of said cylinder, closing jaws carried on said backing plate and adapted to receive the clip formed by said forming jaws in the retracted position of the piston and advance said clip upon the advancing stroke of the piston into engagement with the parts to be connected, a spring carried by said backing plate and adapted to close said closing jaws and clip upon the parts to be connected, a manually operative control lever for releasing said spring, a valve for said cylinder arranged to admit air to the upper end thereof, a valve control rod arranged to reverse the position of said valve and admit air to the lower end of said cylinder, a crank member carried on said backing plate and having one arm arranged to be actuated by the release of said spring and another arm arranged to actuate said control rod, a spring-pressed lock member carried on said backing plate arranged to lock said control rod in actuated position, said lock member having a portion engageable with the piston of said cylinder in the retracted position thereof to disengage said lock member from said control rod, and a cam carried on said backing plate operatively connected to the piston of said cylinder, said cam having a locking ear arranged to prevent actuation of said manual control lever while said jaws are in retracted position, said cam further being connected to stock advancing mechanism to advance a length of stock to said forming jaws.

6. A clip forming and attaching machine comprising a backing plate having a pneumatic cylinder provided with a piston mounted on one end thereof and with a grip carried on the other end thereof, a mandrel carried by said plate and projecting transversely from the lower end thereof, forming jaws carried on said backing plate and reciprocably driven by said piston to cut off a clip blank from a reel of stock and form the stock into a clip about said mandrel upon the advancing stroke of the piston, means actuated by retracting motion of said forming jaws to advance the blank and clip formed thereby transversely along said mandrel, closing jaws carried on said backing plate and reciprocably driven by said piston to receive the clip formed by said forming jaws in the retracted position of said piston and advance said clip upon advancing stroke of the piston into engagement with parts to be connected, a spring carried by said backing plate and adapted to close said closing jaws and clip upon the parts to be connected, a manually operative control lever for releasing said spring, a valve for said cylinder normally biased to admit air to advance the piston, a valve control rod arranged to reverse the position of said valve and admit air to retract the piston, an actuating member carried on said backing plate arranged to be moved by movement of said spring to released position to actuate said control rod, a spring pressed lock member carried on said backing plate arranged to lock said control rod in actuated position, said lock member having a portion engageable with a portion of the piston in the retracted position thereof to disengage said lock member from said control rod, and a cam carried on said backing plate operatively connected to the piston of said cylinder, said cam having a locking ear arranged to prevent actuation of said manual control lever while said jaws are in retracted position.

7. A clip forming and closing machine comprising a backing plate having a motor mounted on one end thereof, forming jaws positioned on said plate, closing jaws carried on said plate and alongside of said forming jaws, said forming and closing jaws being operatively connected to said motor to be reciprocated along said backing plate, a shear block reciprocable with said forming jaws and on the opposite side thereof from said closing jaws, a mandrel carried by said backing plate and extending forwardly between the advanced position of said forming jaws and opposite the retracted position of said closing jaws, stock feed mechanism operative upon advancing stroke of said motor to introduce a length of stock below said shear block and across the top of said mandrel, a clip advancing dog positioned below said mandrel and having arms extending above each side thereof, said arms having forwardly opening notches arranged to receive said stock as it is introduced and hold said stock after it is severed by said shear block, the forward ends of said arms projecting forwardly along the sides and below the top of said mandrel and beyond said notches to engage and advance a clip previously formed around said mandrel by said forming jaws and deliver the clip to said closing jaws, an advance lever pivotally mounted on said backing plate and connected to said dog, and a cam member operatively associated with said stock advancing mechanism arranged to actuate said lever to advance said dog along said mandrel at the end of the retracting motion of said stock feed mechanism and to retract said dog prior to the advancing motion of said stock, said forming jaws having downwardly opening mandrel embracing concave tooth portions and laterally opening notches below said tooth portions facing said notches in said dog and arranged to receive said stock therefrom in the retracted position of said forming jaws.

8. A clip forming and closing machine comprising a backing plate having a motor mounted on one end thereof, forming jaws carried on said backing plate, closing jaws carried on said plate and alongside of said forming jaws, said forming and closing jaws being operatively connected to said motor to be reciprocated along said backing plate with said closing jaws retracting to a position opposite the advanced position of said forming jaws, a shear block reciprocable with said forming jaws and on the opposite side thereof from said closing jaws, a mandrel carried by said backing plate and extending forwardly between the advanced position of said forming jaws and opposite the retracted position of said closing jaws, stock feed mechanism operative upon the advancing stroke of said motor to introduce a length of stock below said shear block and across the top of said mandrel, a clip advancing dog having arms embracing said mandrel, said arms having forwardly opening notches arranged to receive said stock as it is introduced and hold said stock after it is severed by said shear block, the forward ends of said arms projecting forwardly along the sides and below the top of said mandrel and beyond said notches to engage and advance a clip previously formed around said mandrel by said forming jaws and deliver the clip to said closing jaws, an advance lever pivotally mounted on said backing plate and connected to said notches in said dog, a cam member operatively associated with said stock advancing mechanism arranged to actuate said lever to advance said dog along said mandrel at the end of the retracting motion of said feed mechanism and to retract said dog prior to the advancing motion of said stock, and a projection on the top of said mandrel located transversely from said shear block and under the edge of said forming jaws to strip each blank from said notches in said arms as said dog is retracted.

9. A clip forming and applying machine comprising a backing plate, a pneumatic motor secured to said plate and having a connecting rod reciprocable along said plate, a mandrel secured to and projecting forwardly from said plate, forming jaws on said plate and cooperative with said mandrel to form a clip there around, closing jaws on said plate and reciprocable between a retracted position opposite the end of said mandrel and an advanced position below said plate, said forming and closing jaws having lost motion connections with said rod and being arranged to be reciprocated thereby, a pin slidable along said plate with said jaws, a slotted lever pivoted on said plate and oscillatable by engagement of said pin in its slot, a valve for admitting air to said motor, a control rod for moving said valve, a cam lever operatively engaged with said pin to move said control rod and valve to admit air to said motor to advance said jaws, a manually controlled lever on said plate arranged to move said control rod and valve to admit air to said motor to retract said jaws, means operative by said pin to advance a length of stock to said machine on the advancing stroke of said jaws, a shear block movable with said forming jaws to cut said stock into a blank positioned over said mandrel and a clip advancing dog operatively connected to said pin to advance said length of stock and a clip formed from a previously advanced length of stock along said mandrel.

10. A clip forming and applying machine comprising a backing plate having a pneumatic cylinder mounted thereon, a ram member slidable on said backing plate and having a lost motion connection with the piston of said cylinder, forming jaws pivotally connected and reciprocably carried by said backing plate, closing jaws reciprocably carried by said plate, links connecting said forming jaws and closing jaws to said ram member, a movable plate pivotally carried on said backing plate and adapted to close said closing jaws in the advanced position thereof, a mandrel projecting from said backing plate between the closed position of said forming jaws and the retracted position of said closing jaws, means for translating clips formed by said forming jaws along said mandrel to said closing jaws, a spring positioned between said movable plate and a bracket on said backing plate for actuating said movable plate, a cocking cam pivotally mounted on said locking plate and operative to compress said spring, a cocking link connected between said cocking cam and the piston of said cylinder, a trigger lever pivotally mounted on said backing plate and engageable with said movable plate to prevent expansion of said spring, said cocking cam being operative to compress said spring and permit reset of said trigger lever upon initial upward movement of said piston rod and before the lost motion connection between said piston rod and ram is engaged to retract said forming and closing jaws, a valve for actuating said cylinder to retract said jaws, a control rod for said valve, and a lever pivotally mounted on said backing plate and actuatable by release of said movable plate to actuate said control rod.

11. A clip forming and applying machine comprising a backing plate having a motor with a connecting rod mounted thereon, a ram member slidable on said backing plate and having a lost motion connection with said rod, forming jaws pivotally connected and reciprocably carried on said backing plate, closing jaws reciprocably carried on said backing plate, links connecting said forming jaws and closing jaws to said ram member, a movable plate pivotally carried on said backing plate and adapted to close said closing jaws in the advanced position thereof, a mandrel projecting from said backing plate between the closed position of said forming jaws and the retracted position of said closing jaws, means for translating clips formed by said forming jaws along said mandrel to said closing jaws, a spring positioned between said movable plate and a bracket on said backing plate for actuating said movable plate, a cocking cam pivotally mounted on said backing plate and operative to compress said spring, a cocking link connected between said cocking cam and said rod, and a trigger lever pivotally mounted on said backing plate and engageable with said movable plate to prevent expansion of said spring, said cocking cam being operative to compress said spring and permit reset of said trigger lever upon initial upward movement of said rod and before the lost motion connection between said rod and ram is engaged to retract said forming and closing jaws.

12. In a clip forming and applying machine, a backing plate having clip forming and clip closing jaws mounted thereon, a mandrel projecting from said backing plate between the closed position of said forming jaws and the retracted position of said closing jaws, means for translating clips formed by said forming jaws along said mandrel to said closing jaws, said closing jaws being reciprocable to an advanced position below said plate, said plate being manually movable over a cushion structure to which clips are to be applied, a retaining plate secured to said backing plate between said forming and closing jaws, a movable plate positioned closely along one side of said closing jaws for closing said closing jaws, extensions on said retaining plate and movable plate extending below said backing plate on each side of the advanced and extended position of said closing jaws, said extensions defining a concave notch slightly smaller than the extended opening of said closing jaws and registering therewith to laterally support a clip therebetween, means for reciprocating said jaws and actuating said clip translating means in timed relation, and control means arranged to stop said reciprocating means with said jaws advanced.

13. In a clip forming and applying machine, a backing plate having clip forming and clip closing jaws mounted thereon, a mandrel projecting from said backing plate between the closed position of said forming jaws and the retracted position of said closing jaws, means for translating clips formed by said forming jaws along said mandrel to said closing jaws, said closing jaws being reciprocable to an advanced position below said plate, said plate being manually movable over a structure to which clips are to be applied, a retaining plate secured to said backing plate closely along side of said closing jaws, a movable plate positioned closely along one side of said closing jaws for closing said closing jaws, and an extension on said retaining plate extending below said backing plate along side of the advanced and extended position of said closing jaws, said extension defining a concave notch slightly smaller than the extended opening of said closing jaws and registering therewith to laterally support a clip therebetween, means for reciprocating said jaws and actuating said clip translating means in timed relation, and control means arranged to stop said reciprocating means with said jaws advanced.

14. A clip forming and applying machine comprising a backing plate having a pneumatic cylinder mounted thereon, a ram member slidable on said backing plate and having a lost motion connection with the piston of said cylinder, forming jaws pivotally connected and reciprocably carried on said backing plate, closing jaws reciprocably carried by said backing plate, links connecting said forming jaws and closing jaws to said ram member, cam surfaces on said backing plate arranged to close said forming jaws in their advanced position, a movable plate pivotally carried on said backing plate and having a flange adapted to close one of said closing jaws against the other of said closing jaws, a retaining plate positioned between said forming jaws and closing jaws, said retaining plate being relieved to form an abutment for the other of said closing jaws, a spring positioned between said movable plate and a portion of said backing plate for actuating said movable plate, a trigger lever pivotally mounted on said backing plate and engageable with said movable plate to prevent expansion of said spring, a cocking cam pivotally mounted on said backing plate and engageable with a portion of said movable plate, a cocking link connected between said cocking cam and the piston of said cylinder, said cocking cam being operative to compress said spring and permit reset of said trigger lever upon initial retracting movement of said piston rod and before the lost motion connection between said piston rod and ram is engaged to retract said jaws, a manual control lever on said plate for disengaging said trigger lever from said movable plate, a cam member on said backing plate, a pin carried by said ram arranged to oscillate said cam member to advance the length of wire into said machine upon advancing motion of said ram, and a locking ear on said cam member lockingly engaged with said manual control lever to prevent actuation of said manual lever except when said ram is in advanced position.

15. A clip forming and applying machine comprising a backing plate having driving mechanism mounted thereon, a ram member slidable on said backing plate and having a lost motion connection with said driving mechanism, forming jaws pivotally connected and reciprocably carried on said backing plate, closing jaws reciprocably carried by said backing plate, links connecting said forming jaws and closing jaws to said ram member, a movable plate pivotally carried on said backing plate and adapted to close one of said closing jaws against the other of said closing jaws, a spring positioned between said movable plate and a bracket on said backing plate for actuating said movable plate, control members for said driving mechanism and operative upon actuation of said movable plate to start said driving mechanism, a cocking cam pivotally mounted on said backing plate and engageable with a portion of said movable plate, a cocking link connected between said cocking cam and said drive mechanism, said cocking cam being operative upon initial retracting movement of said driving mechanism and before the lost motion connection between said driving mechanism and ram is operative to retract said jaws, a trigger lever pivotally mounted on said backing plate and engageable with said movable plate to prevent expansion of said spring, a manual control lever on said plate for disengaging said trigger lever from said movable plate, a cam member on said plate, a pin carried by said ram arranged to oscillate said cam member to advance a length of wire into said machine upon advancing motion of said ram, and a locking ear on said cam member lockingly engaged with said manual control lever to prevent actuation of said manual lever except when said ram is in advanced position.

16. A clip forming and applying machine comprising a backing plate, forming jaws reciprocable along said backing plate, a mandrel on said backing plate cooperative with said forming jaws, closing jaws reciprocable along said backing plate, a movable plate pivotally carried on said backing plate and arranged to close said closing jaws, a spring positioned between said movable plate and backing plate for actuating said movable plate, a power source for reciprocating said jaws and compressing said spring, a trigger lever pivoted on said backing plate and engageable with said movable plate to prevent expansion of said spring, a trigger link pivotally connected to said trigger lever, a second spring urging said trigger lever and link to locking position, a third spring connected to the free end of said trigger link, said trigger link having a cam surface formed thereon, a stop on said backing plate and engageable with said cam surface to laterally displace said trigger link and extend said third spring upon trigger disengaging motion of said trigger link, a manually operable lever on said backing plate, and an arm connected to said manual lever and having a nose slidably engageable with said trigger link to move said trigger link to trigger disengaging position upon actuation of said manual lever, said nose being arranged to disengage from said trigger link upon lateral motion of said link.

17. A clip forming and applying machine comprising a backing plate, forming and closing jaws reciprocably carried by said backing plate, a driving mechanism for reciprocating said jaws, said jaws having a lost motion connection with said driving mechanism, a mandrel projecting from said backing plate between the closed position of said forming jaws and the retracted position of said closing jaws, means for translating clips formed by said forming jaws along said mandrel to said closing jaws, a spring pressed lever for closing said closing jaws in the advanced position thereof, a cocking lever directly connected to said driving mechanism for cocking said spring pressed lever, a trigger lever for holding said spring pressed lever in cocked position, control linkage operative upon release of said spring pressed lever for actuating said driving mechanism, other linkage operative upon retraction of said jaws for reversing said driving mechanism, a trigger link pivotally connected to said trigger lever, and a manual control lever having an automatically disengageable connection with said trigger link for actuating said trigger link to disengage said trigger lever whereby said trigger lever will be operative to lock said spring pressed lever after each cycle of operation thereof regardless of the position of the said manual control lever.

18. A clip forming and applying machine comprising a backing plate, forming and closing jaws reciprocably carried by said backing plate, a driving mechanism reciprocating said jaws, said jaws having a lost motion connection with said driving mechanism, a mandrel projecting from said backing plate between the closed position of said forming jaws and the retracted position of said closing jaws, means for translating clips formed by said forming jaws along said mandrel to said closing jaws, a spring pressed lever for closing said closing jaws in the advanced position thereof, a cocking lever connected to said driving mechanism for cocking said spring pressed lever, a trigger lever for holding said spring pressed lever in cocked position, control linkage operative upon release of said spring pressed lever for actuating said driving mechanism, other linkage operative upon retraction of said jaws for reversing said driving mechanism, a trigger link pivotally connected to said trigger lever, and a manual control lever having an automatically disengageable connection with said trigger link for actuating said trigger link to disengage said trigger lever whereby said manual lever will be disengaged from said trigger link after each actuation thereof.

19. A clip forming and applying machine comprising a backing plate, a mandrel on said plate, forming jaws cooperable with said mandrel for forming clips from a strip of stock, closing jaws reciprocable from a retracted position opposite said mandrel to an advanced position below said plate and arranged to receive clips formed by said forming jaws, means for translating clips along said mandrel from said forming jaws to said closing jaws, spring means for closing said closing jaws and clips in the advanced position thereof, a motor carried on said plate for reciprocating said jaws and compressing said spring means, a trigger for holding said spring means compressed, a control member for said motor actuatable by release of said spring means to retract said jaws, automatic means for reversing said motor at the end of its retracting motion, a manual control lever for releasing said trigger, an operator's grip positioned adjacent to said manual lever, and a support for said plate whereby said machine is yieldingly supported over parts to be connected thereby.

ANTHONY LENART.
BERNARD HEILMAN.

REFERENCES CITED

The following references are of record in the file of this patent:

UNITED STATES PATENTS

| Number | Name | Date |
|---|---|---|
| 1,841,820 | Kirchner | Jan. 19, 1932 |
| 1,999,923 | Binch | Apr. 30, 1935 |
| 2,055,257 | Maynard | Sept. 22, 1936 |
| 2,130,779 | Smith et al. | Sept. 20, 1938 |
| 2,145,461 | Smith | Jan. 31, 1939 |
| 2,147,976 | Harrison | Feb. 21, 1939 |
| 2,208,819 | Smith | July 23, 1940 |
| 2,217,840 | Hill | Oct. 15, 1940 |
| 2,222,220 | Binch | Nov. 19, 1940 |
| 2,325,322 | Jackson | Jan. 27, 1943 |
| 2,329,202 | Jonassen | Sept. 14, 1943 |
| 2,341,347 | Weber et al. | Feb. 8, 1944 |
| 2,396,562 | Forss | Mar. 12, 1946 |
| 2,453,872 | Stauffer | Nov. 16, 1948 |

FOREIGN PATENTS

| Number | Country | Date |
|---|---|---|
| 457,645 | Great Britain | Dec. 2, 1936 |